United States Patent
Muramatsu et al.

(10) Patent No.: US 6,532,206 B2
(45) Date of Patent: Mar. 11, 2003

(54) INFORMATION RECORD MEDIUM WITH A RECORD/REPRODUCTION AREA AND A REPRODUCTION-DEDICATED AREA

(75) Inventors: Eiji Muramatsu, Tokorozawa (JP); Shoji Taniguchi, Tokorozawa (JP); Masahiro Kato, Tokorozawa (JP)

(73) Assignee: Pioneer Corporation, Tokyo-To (JP)

( * ) Notice: Subject to any disclaimer, the term of this patent is extended or adjusted under 35 U.S.C. 154(b) by 0 days.

(21) Appl. No.: 09/781,271

(22) Filed: Feb. 13, 2001

(65) Prior Publication Data

US 2001/0014077 A1 Aug. 16, 2001

(30) Foreign Application Priority Data

Feb. 14, 2000 (JP) .......................................... 2000-39800

(51) Int. Cl.⁷ ................................................ G11B 7/24
(52) U.S. Cl. .................................. 369/275.3; 369/44.26
(58) Field of Search ........................... 369/275.1, 275.3, 369/44.26

(56) References Cited

U.S. PATENT DOCUMENTS

| | | | | |
|---|---|---|---|---|
| 5,453,969 A | * | 9/1995 | Psaltis et al. | 369/275.1 X |
| 5,659,613 A | * | 8/1997 | Copeland et al. | 360/60 X |
| 5,666,345 A | * | 9/1997 | Takahashi et al. | 369/275.1 |
| 5,719,937 A | * | 2/1998 | Warren et al. | 360/60 X |
| 5,724,327 A | * | 3/1998 | Timmerman et al. | 369/275.4 X |
| 6,031,815 A | * | 2/2000 | Heemskerk | 369/275.3 |
| 6,038,207 A | * | 3/2000 | Wachi | 369/275.1 |
| 6,078,559 A | * | 6/2000 | Takemura et al. | 369/275.3 |
| 6,081,490 A | * | 6/2000 | Kuroda et al. | 369/47 |
| 6,101,158 A | * | 8/2000 | Hogan | 369/47 |
| 6,128,271 A | | 10/2000 | Ohta | 369/275.4 |
| 6,209,092 B1 | * | 3/2001 | Linnartz | 713/176 |
| 6,292,446 B1 | * | 9/2001 | Watabe | 369/275.3 X |
| 6,307,824 B1 | * | 10/2001 | Kuroda et al. | 369/53.11 |

FOREIGN PATENT DOCUMENTS

| | | |
|---|---|---|
| EP | 0 874 356 A | 10/1998 |
| EP | 0 880 131 A | 11/1998 |
| EP | 0 893 794 A | 1/1999 |
| WO | WO00/07183 | 2/2000 |

OTHER PUBLICATIONS

"Pioneer Introduces Industry's First DVD Recorder" Internet Article Nov. 25, 1999.

Proh Personal Computers: DVD recordable writer drives specifications and white sheet Internet Article – Mar. 14, 1999.

* cited by examiner

*Primary Examiner*—Aristotelis M. Psitos
(74) *Attorney, Agent, or Firm*—Sughrue Mion, PLLC

(57) ABSTRACT

On an information record medium (1), information is optically recorded and reproduced while a servo control is performed with respect to the information record medium by a push-pull method. The information record medium is provided with: a record/reproduction area (DA) having a groove track (2), which is wobbled and continuously formed and on which the information is recorded and reproduced by a phase changing method by use of a light beam (B) having a wavelength of not less than 630 nm (nanometer) and not more than 680 nm; and a reproduction-dedicated area (RA) where a plurality of phase pits (PI) are wobbled and formed in advance, each having a depth of not less than 60 nm and not more than 90 nm and where only an information reproduction is possible by the light beam.

9 Claims, 6 Drawing Sheets

INFORMATION RECORD MEDIUM WITH A RECORD/REPRODUCTION AREA AND A REPRODUCTION-DEDICATED AREA

BACKGROUND OF THE INVENTION

1. Field of the Invention

The present invention generally relates to an information record medium, and more particularly to an information record medium on which information can be optically recorded and reproduced in accompaniment with a tracking servo control of a so-called push-pull method.

2. Description of the Related Art

There is a DVD as an information record medium, whose record capacity is improved to be as high as several times of that of a conventional CD (Compact Disc), and on which video information and audio information in an information amount of one full move or the like can be recorded.

Other than the DVD dedicated for reproduction such as a DVD-ROM (DVD-Read Only), there is a so-called DVD-RW (DVD Re-recordable) as a DVD standard, on which the information can be reproduced and recorded at a plurality of times, and on which the information can be reproduced by an information reproducing apparatus for reproducing the DVD dedicated for reproduction.

Here, on an information record medium based on the DVD-RW standard, there is formed a groove track, which has a width of about 0.3 μm and a depth of about 20 nm (nanometer) and which is wobbled at a constant frequency, as an information track on which the optical information recording and reproduction is performed. At this time, the reason why the groove track is wobbled is to generate a record standard clock signal having an accurate frequency synchronous with the rotation of the DVD-RW, by detecting the frequency of the wobbling at the time of information recording.

On the other hand, the DVD-RW basically has a record capacity substantially same as that of the DVD dedicated for reproduction. Thus, the video information etc., recorded on the DVD dedicated for reproduction may be illegally copied onto the DVD-RW. At this time, the video information or the like recorded on the DVD dedicated for reproduction is generally protected by a copy right, so that the copy right holder drastically suffers losses if the above mentioned illegal copy is often performed.

Therefore, there is a countermeasure against such an illegal copy according to the DVD-RW standard that the area on the DVD-RW, which corresponds to the area where control information for controlling the reproduction is recorded on the DVD dedicated for reproduction, is set as an area where recording is impossible on the DVD-RW, to thereby prevent the illegal copy.

In addition to this, according to the DVD-RW standard, it is permitted to prepare an area dedicated for reproduction on the above mentioned area where recording is impossible, and to record the predetermined reproduction control information etc., in advance in this area. Further, according to the DVD-RW standard, the phase pit, which is used in the DVD dedicated for reproduction, is also used to record this predetermined reproduction control information etc., in the area dedicated for reproduction of the DVD-RW.

On the other hand, according to the DVD-RW standard, at the time of optically recording and/or reproducing the information by use of the light beam such as a laser light with respect to the DVD-RW, the tracking servo control is performed by means of the so-called push-pull method.

However, if it is attempted to obtain the tracking error signal by the push-pull method at the time of reproducing the reproduction control information, which is recorded in the area dedicated for reproduction by forming the phase pit, it may be difficult to obtain the tracking error signal and a detection signal corresponding to the reproduction control information at an adequate signal quality, because of an influence of an interference with a pre-pit formed in the area dedicated for reproduction in advance (i.e., a pre-pit, which is formed within a land track formed adjacent to the groove track and is to record address information (i.e., address information indicating a record position on the DVD-RW) which is used when recording the information onto the groove track other than the area dedicated for reproduction), which is a problem.

SUMMARY OF THE INVENTION

It is therefore an object of the present invention to provide an information record medium, on which the detection signal corresponding to the reproduction control information and the tracking error signal by means of the push-pull method can be obtained at adequate signal qualities, in case that the reproduction control information is reproduced from the area dedicated for reproduction on the DVD-RW.

The above object of the present invention can be achieved by an information record medium, on which information is optically recorded and reproduced while a servo control is performed with respect to the information record medium by a push-pull method. The information record medium is provided with: a record/reproduction area having a groove track, which is wobbled and continuously formed and on which the information is recorded and reproduced by a phase changing method by use of a light beam having a wavelength of not less than 630 nm (nanometer) and not more than 680 nm; and a reproduction-dedicated area where a plurality of phase pits are wobbled and formed in advance, each having a depth of not less than 60 nm and not more than 90 nm and where only an information reproduction is possible by the light beam.

According to the information record medium of the present invention, since the phase pit formed in the reproduction-dedicated area has the depth of not less than 60 nm and not more than 90 nm, it is possible to obtain both of (i) a detection signal corresponding to the information to be reproduced by an enough output level by the light beam for recording and reproducing having the wavelength in the above mentioned range and (ii) an error signal for a servo control of the push-pull method, in the reproduction-dedicated area.

In this manner, it is possible to prevent an illegal copy with respect to the information record medium and an illegal reproduction of the illegally copied information, by preparing the reproduction-dedicated area where only the reproduction is possible, and it is also possible to record the necessary information in advance such as the copy control information or the like by using the phase pit within the reproduction-dedicated area and then appropriately reproduce the necessary information.

In one aspect of the information record medium of the present invention, the depth of the phase pit is not less than 70 nm and not more than 80 nm.

According to this aspect, since the depth of the phase pit formed in the reproduction-dedicated area is not less than 70 nm and not more than 80 nm, it is possible to obtain the detection signal and the error signal at the higher output levels.

In another aspect of the information record medium of the present invention, a pre-pit indicating address information, which corresponds to a record position on the information record medium, of the information, is formed within at least the record/reproduction area except the reproduction-dedicated area.

According to this aspect, it is possible to prevent the operation of obtaining the detection signal and the error signal from the reproduction-dedicated area from being disturbed by the pre-pit.

In another aspect of the information record medium of the present invention, unreadable area, which has a plurality of phase pits wobbled and formed in advance and where it is not possible to record or reproduce the information by the light beam, is further formed between the reproduction-dedicated area and the record/reproduction area on the information record medium.

According to this aspect, since the unreadable area is formed between the reproduction-dedicated area and the record/reproduction area, it is possible to avoid an illegal copy and an illegal reproduction with respect to the information record medium, by the existences of the unreadable area and the reproduction-dedicated area.

In this aspect, a pre-pit may be formed within the unreadable area, and the address information indicated by the pre-pit within the unreadable area, may be set on the basis of the address information corresponding to a head of the record/reproduction area within the information record medium.

By constructing in this manner, it is possible to record the information with respect to the record/reproduction area while grasping the record position accurately without being influenced by the existence of the reproduction-dedicated area.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENT

An embodiment of the present invention will be now explained with reference to FIG. 1 to FIG. 5. In the embodiment explained hereinbelow, the present invention is applied to the DVD-RW as one example of an information record medium, which is a DVD capable of rerecording the information at a plurality of times.

Figure 1:
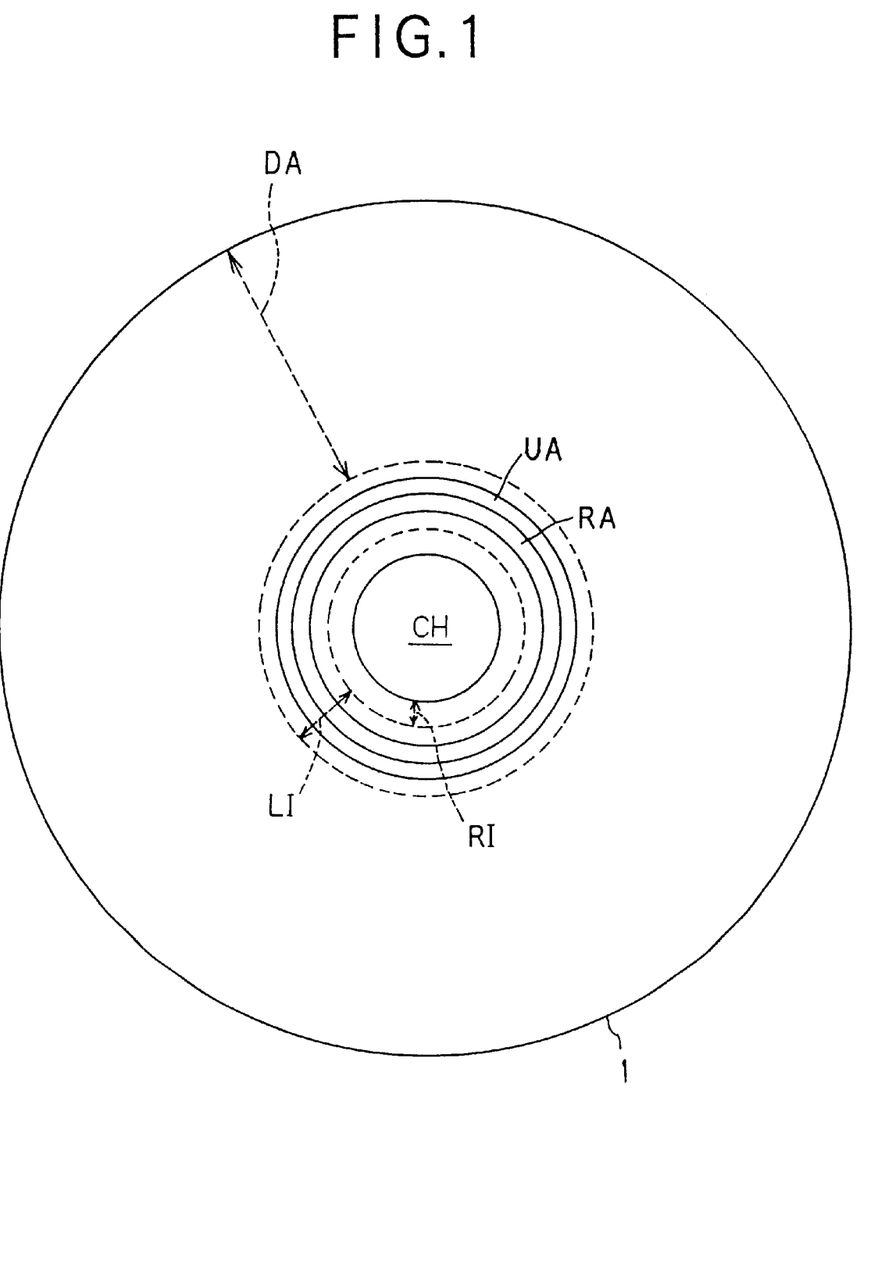
FIG. 1 is a plan view of a DVD-RW as an embodiment of the present invention.
Figure 2A:
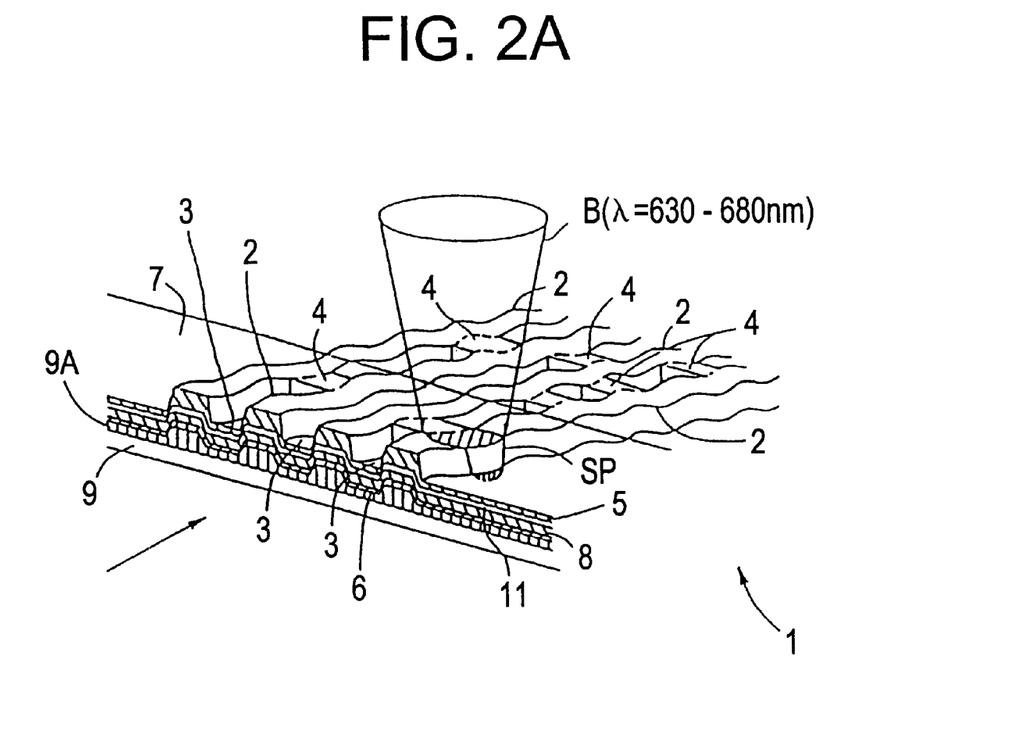
FIG. 2A is a perspective view of the DVD-RW at a portion where a pre-pit is formed of the embodiment.
Figure 2B:
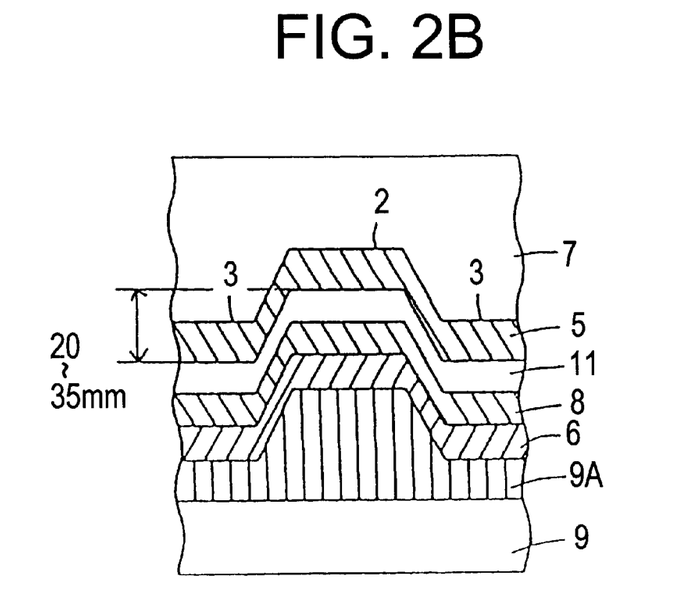
FIG. 2B is a partial sectional view of the DVD-RW in the embodiment.
Figure 3:
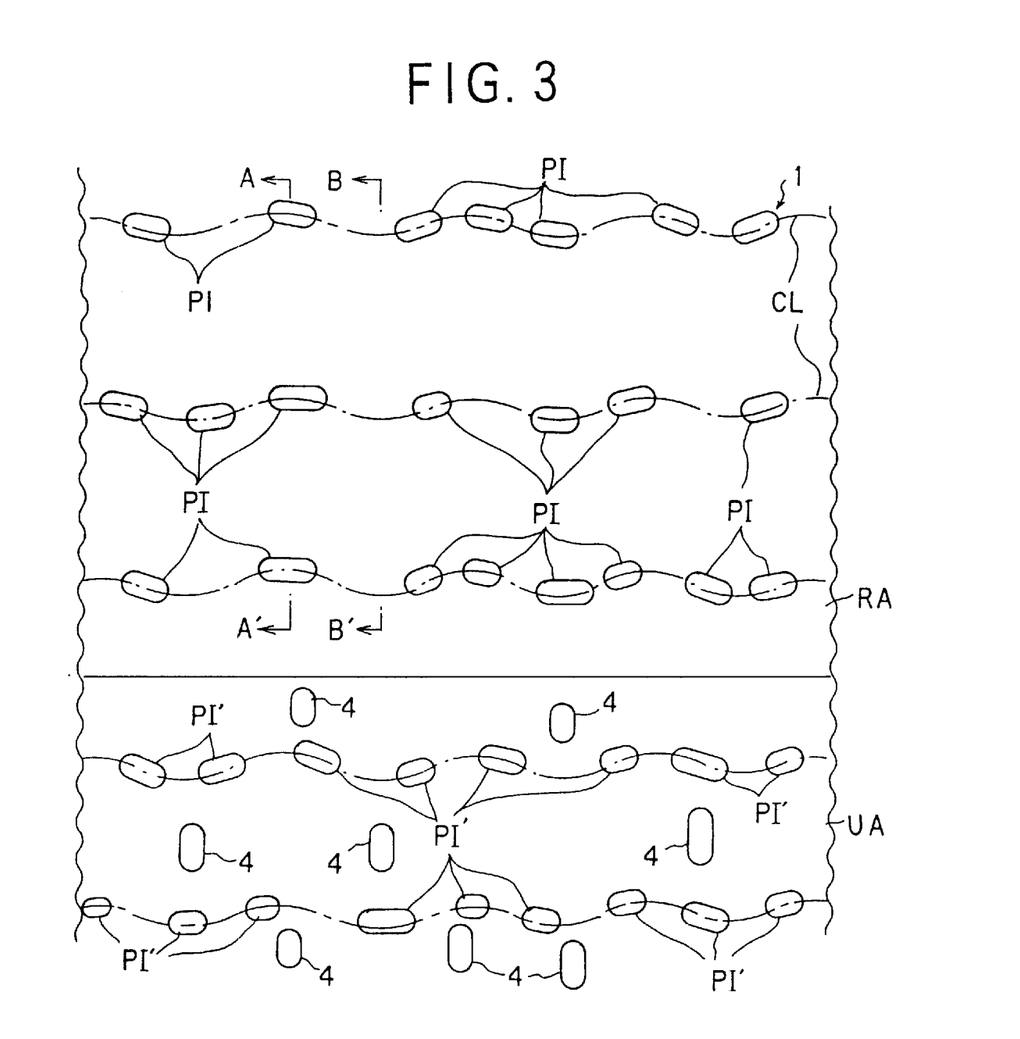
FIG. 3 is an enlarged plan view of the DVD-RW at an area dedicated for reproduction and an unreadable area in the present embodiment.
Figure 4A:
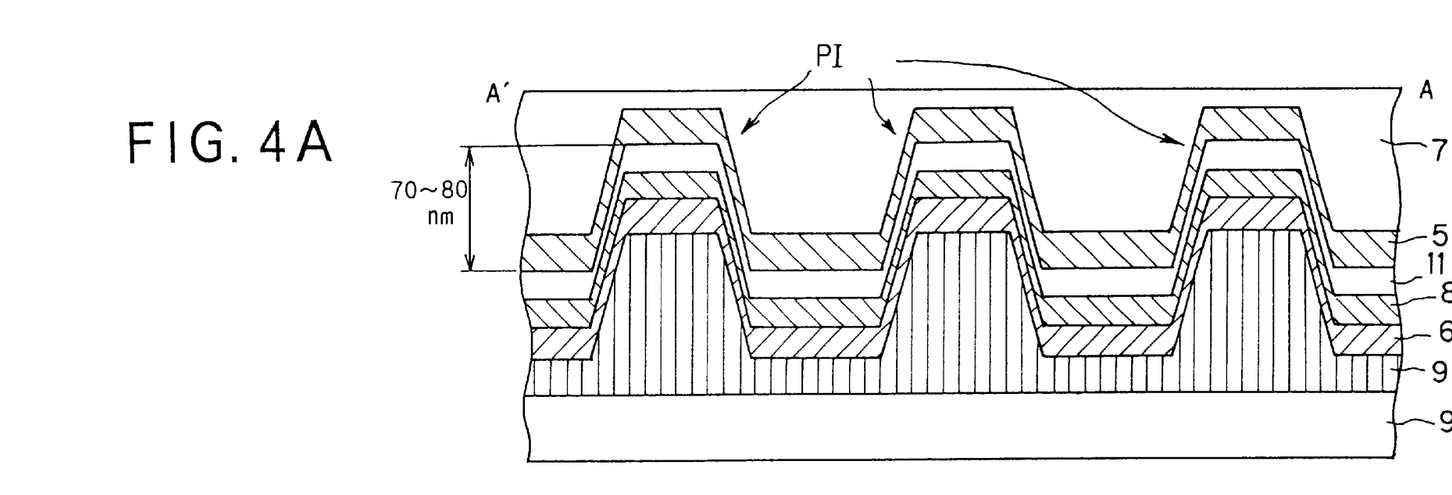
FIG. 4A is a partial sectional view of the DVD-RW at a portion where the phase pit is formed in the area dedicated for reproduction in the embodiment.
Figure 4B:
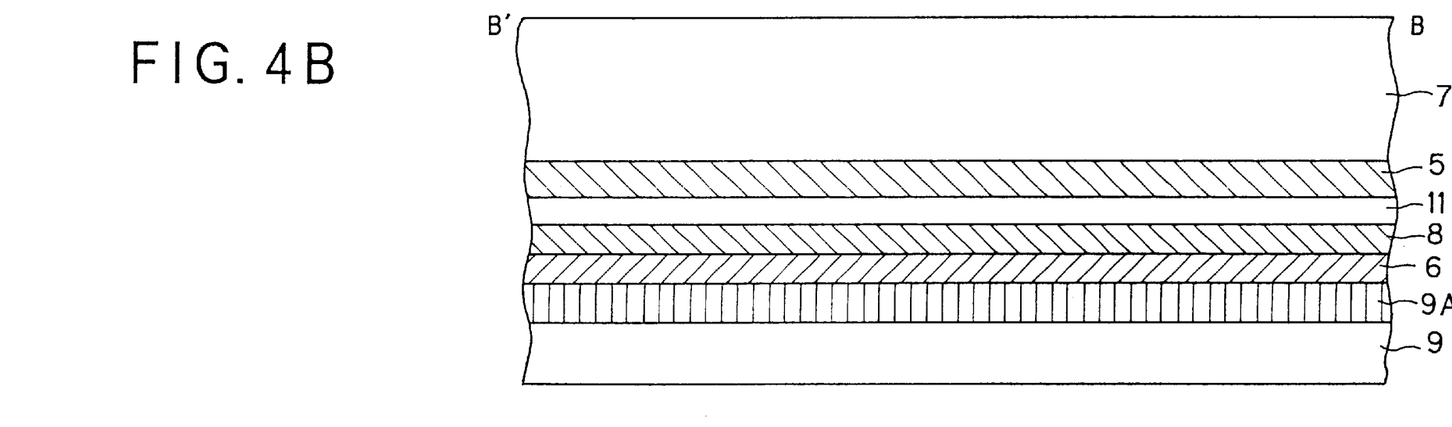
FIG. 4B is a partial sectional view of the DVD-RW at a portion where the phase pit is not formed in the area dedicated for reproduction in the embodiment.
Figure 5:
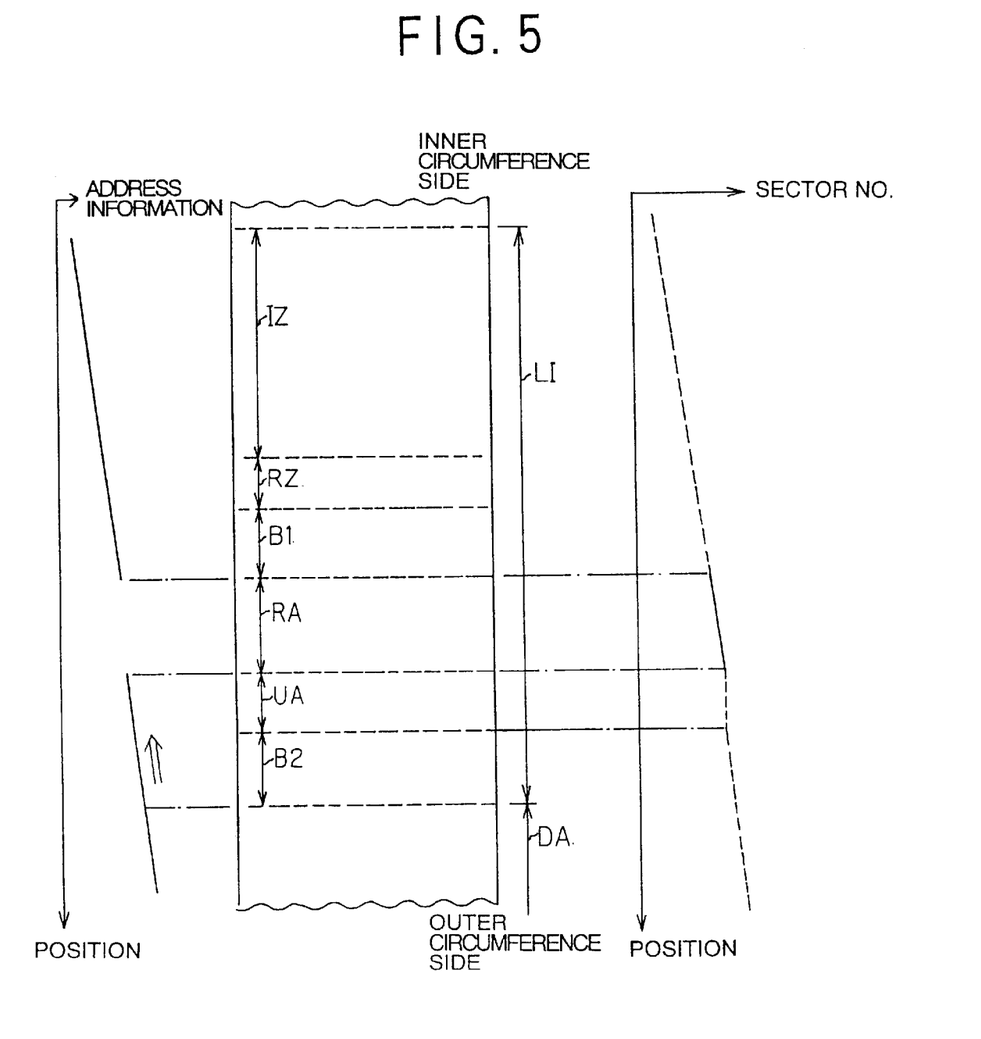
FIG. 5 is a diagram showing one portion of a record format in the DVD-RW in the embodiment.
Figure 6:
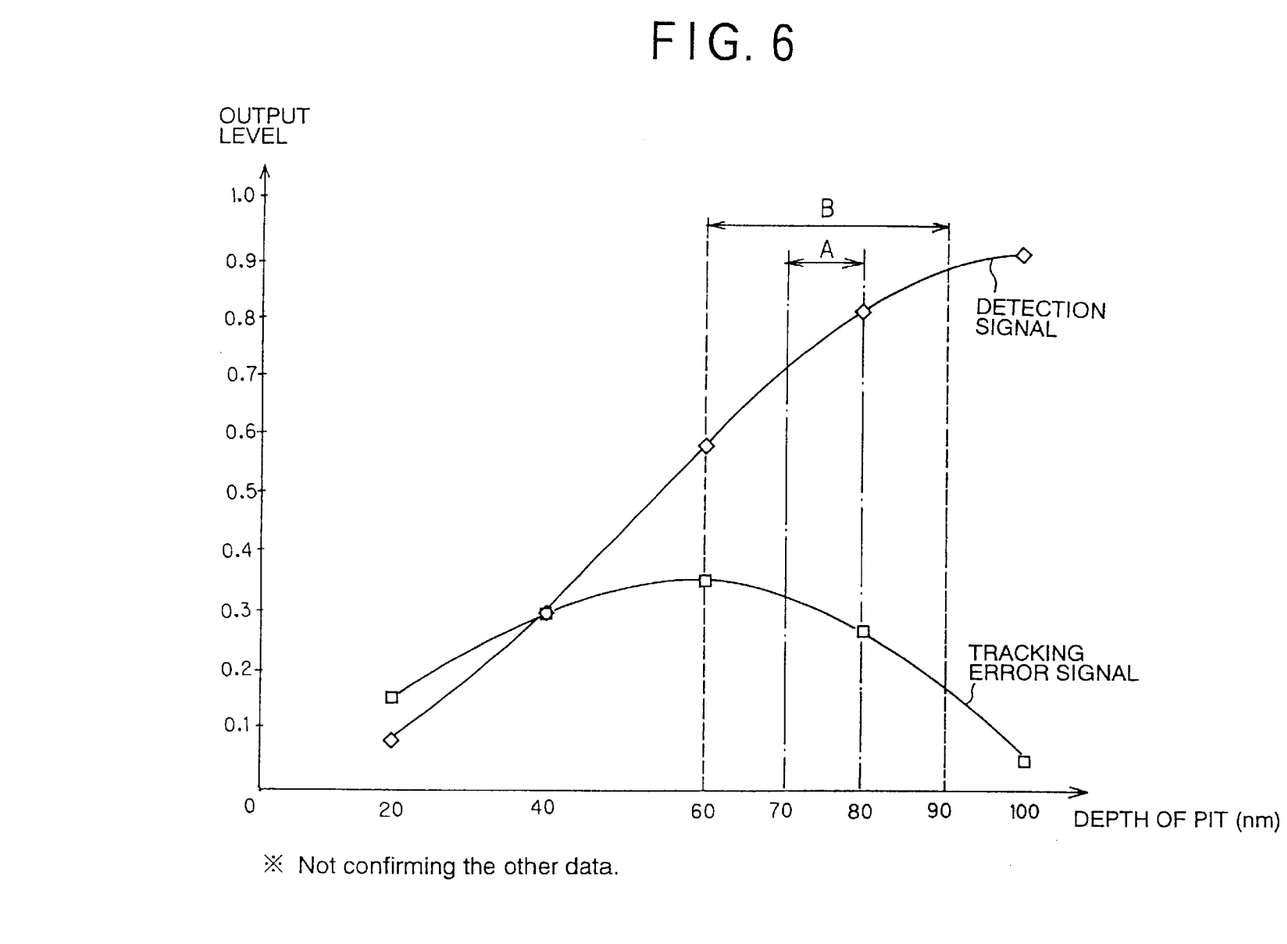
FIG. 6 is a graph showing a result of an experiment corresponding to the embodiment.

FIG. 1 is a plan view of the DVD-RW as the embodiment (i.e., a plan view at the time of shipment from a manufacturing factory (which is simply referred to as "at the shipment" hereinafter)). FIG. 2A and FIG. 2B are the perspective and sectional views of the DVD-RW in which a pre-pit described layer is formed. FIG. 3 shows the structures of the area dedicated for reproduction and the unreadable area described later. FIG. 4 shows the structure of the area dedicated for reproduction. FIG. 5 shows one portion of the format of the DVD-RW. FIG. 6 indicates a result of the experiment of the present embodiment.

As shown in FIG. 1, at the shipment, a DVD-RW 1 as the embodiment of the present invention has such a structure that a clamp hole CH is opened at a center thereof, which is used to fix the DVD-RW 1 onto a spindle motor (for rotating the DVD-RW 1 at a rotation number set in advance) of an information recording apparatus (not illustrated) for recording record information (which is defined as information such as video information, audio information or the like other than pre-information described later to be primarily recorded on the DVD-RW 1, hereinafter) onto the DVD-RW 1, and that a reproduction-dedicated area RA, which is an area dedicated for reproduction where the information can be only reproduced, and an unreadable area UA where the information cannot be reproduced or recorded, are prepared in a coaxial or spiral manner.

At this time, an area on the DVD-RW 1, which corresponds to an area where the control information for controlling the reproduction is recorded in case of the DVD dedicated for reproduction, is assigned to the reproduction-dedicated area RA and the unreadable area UA, so as to prevent the illegal copy with respect to the DVD-RW 1 as described above.

After the initialization set in advance is performed at first upon recording the record information onto the DVD-RW 1 by the information recording apparatus, the DVD-RW 1 is provided with: (i) a control information area RI where control information used for recording and reproducing the record information on the DVD-RW 1 is recorded by the initialization (e.g., setting information to set a light intensity of the light beam to perform recording and reproducing, record control information used for recording or the like); (ii) a lead in area LI where start information to start recording and reproducing is recorded by the initialization; and (iii) a record/reproduction area DA where the record information to be primarily recorded on the DVD-RW 1 is actually recorded, in this order from an inner circumference side thereof as indicated by broken lines in. FIG. 1. Incidentally, in FIG. 1, in order to distinguish the reproduction-dedicated area RA and the unreadable area UA which have been already formed at the shipment, from the control information area RI, the lead in area LI and the record/reproduction area DA which are formed after the initialization, the division lines of the control information area RI, the lead in area LI and the record/reproduction area DA are illustrated as the broken lines.

At this time, after the initialization, the reproduction-dedicated area RA and the unreadable area UA are both included in the lead in area LI.

Further, a lead out area (not illustrated), where end information indicating an end of recording the record information with respect to the DVD-RW 1 is recorded, is formed at the outermost circumference of the record/reproduction area DA when the operation of recording the record information with respect to the DVD-RW 1 as a whole is ended.

Next, the structure of the DVD-RW 1 at the record/reproduction area DA is explained with reference to FIG. 2. FIG. 2A is a perspective view showing the structure of the DVD-RW 1 at the record/reproduction area DA, while FIG. 2B is a sectional view seeing a groove track in FIG. 2A from an arrow direction in FIG. 2A.

In the DVD-RW 1, address information indicating the record position of the information on the DVD-RW 1 is recorded as pre-information at the shipment by forming a pre-pit (which may be referred to as a "land pre-pit"), in an area which is to become the above mentioned lead in area LI after the initialization by the information recording apparatus (except for the reproduction-dedicated area RA described later) and the record/reproduction area DA.

In addition, in the area which is to become the record/reproduction area DA after the initialization, a low frequency signal, which is the standard to generate a record clock signal used for controlling a recording operation on the whole with respect to the DVD-RW 1 (including the rotation number control of the DVD-RW 1) in the information recording apparatus, is also recorded in advance at the shipment, by wobbling a groove track 2 described later at the low frequency (i.e., by wobbling the groove track 2 by a cycle corresponding to the low frequency).

Next, the structure is more tangibly explained.

In FIG. 2A and FIG. 2B, the DVD-RW 1 is a phase changing type DVD-RW, which has a record layer 11 comprising a phase changing thin film and on which the record information can be recorded at a plurality of times. The groove track 2, which is the information track on which the record information is to be recorded, and a land tack 3, which is to guide a light beam B such as a laser beam as a reproduction light or a recording light onto the groove track 2, are formed adjacent to each other on a disc substrate 9.

In the respective groove track 2, especially as shown in FIG. 2B, (i) protection layers 5 and 8, which sandwich the record layer 11 and have a function to protect the record layer 11, (ii) a reflection layer 6 to reflect the light beam B at the time of reproducing the recorded record information and (iii) a resin layer 9A and a protection layer 7 to further protect the record layer 11, the protection layers 5 and 8 and the reflection layer 6 from an external atmosphere or the like, are laminated and formed on the substrate 9.

At this time, it is standardized that the depth of the groove track 2 is not less than 20 nm (nanometer) and not more than 35 nm at the position of the record layer 11. The interval between central lines of adjacent turns of the groove track 2 is 0.74 µm.

On the other hand, a pre-pit 4 corresponding to the above mentioned pre-information is already formed on the land track 3 at the shipment.

Further, in the DVD-RW 1, the groove track 2 is wobbled to be in correspondence with the low frequency signal (e.g., a 140 kHz signal) which is used to generate the above mentioned record clock signal.

At the time of recording the record information onto the DVD-RW 1, as the information recording apparatus detects the low frequency signal at the wobbling of the groove track 2, the record clock signal is obtained, so that the recording operation on the whole with respect to the DVD-RW 1 is controlled on the basis of the obtained record clock signal. Along with this, as the information recording apparatus obtains the pre-information in advance by detecting the pre-pit 4, the optimum output of the light beam B as the recording light or the like is set on the basis of the obtained pre-information, so that the record information is recorded at the record position on the basis of this obtained address information.

As shown in FIG. 2A, at the time of recording the record information, the record information is recorded by irradiating the light beam B such that the center of the light beam B is positioned at the center of the groove track 2, and then forming the phase change pit corresponding to the record information on the groove track 2.

Here, the size of a light spot SP is set such that one portion of the light spot SP is on the land track 3 beside the groove track 2. Then, by using the reflection light of this one portion of the light spot SP irradiated on the land track 3, the pre-information is detected from the pre-pit 4 by the push-pull method (e.g., the radial push-pull method using a photo-detector divided by a division line parallel to the rotation direction of the DVD-RW 1), so that the pre-information can be obtained. Further, the multiplexed frequency signal is detected from the groove track 2 by using the reflection light of the light spot SP irradiated on the groove track 2, so that the record clock signal is generated or the address information is obtained.

Further, it is also standardized that a so-called tracking servo control to accurately irradiate the light beam B onto the groove 2 in a manner shown in FIG. 1A by controlling the light beam B to track the positional change of the groove track 2 (i.e., the positional change in the radial direction in accompaniment with the rotation of the DVD-RW 1), is performed by means of the push-pull method.

Next, the structure of the DVD-RW 1 in the reproduction-dedicated area RA is explained with reference to FIG. 3, FIG. 4A and FIG. 4B. FIG. 3 is an enlarged plan view showing the structure in the vicinity of the boundary between the reproduction-dedicated area RA and the unreadable area UA of the DVD-RW 1. FIG. 4A is a partial sectional view showing the portion where the phase pit is formed in the reproduction-dedicated area RA (i.e., the A–A' sectional view of FIG. 3) which is seen from the same direction as FIG. 2B. FIG. 4B is a partial sectional view showing the portion where the phase pit is not formed in the reproduction-dedicated area RA (i.e., the B–B' sectional view of FIG. 3) which is seen from the same direction as FIG. 2B.

The groove track 2 and the land track 3 continuing as shown in FIG. 2A and FIG. 2B are not formed in the above mentioned reproduction-dedicated area RA.

In the reproduction-dedicated area RA, the reproduction control information or the like used to reproduce the record information from the DVD-RW 1 is recorded by a phase pit PI (i.e., a phase pit, which is same as the phase pit formed on the DVD dedicated for reproduction and which is to judge the presence or absence of the phase pit and thereby detect the reproduction control information or the like, as the light beam B irradiated on the area where the phase pit is formed is diffracted by the phase pit), which is intermittently formed and is wobbled at the same frequency as the groove track 2 as shown in FIG. 3 (in which the condition of wobbling is illustrated by a central line CL).

At this time, the depth of the phase pit PI within the reproduction-dedicated area RA is not less than 60 nm (nanometer) and not more than 90 nm (preferably not less than 70 nm and not more than 80 nm) at the position of the record layer 11. The interval between the central lines of one phase pit PI and another phase pit PI which are adjacent to each other in the radial direction of the DVD-RW 1 is set to 0.74 μm same as the case of the groove track 2.

On the other hand, the portion of the reproduction-dedicated area RA where the phase pit PI is not formed is a plane surface as shown in FIG. 4B.

In the reproduction-dedicated area RA, the pre-pit 4 is not formed. This is because, if the phase pit PI and the pre-pit 4 are formed within the same area, it is difficult or impossible to detect both of those pits since both of those pits are optically interfering with each other.

Next, the structure of the DVD-RW 1 at the unreadable area UA is explained with reference to FIG. 3.

In the above described unreadable area UA, there is not formed the groove track 2 or the land track 3 continuing in the same manner as the reproduction-dedicated area RA.

In the unreadable area UA, the phase pit PI' is wobbling and is irregularly formed.

At this time, the depth of the phase pit PI' is not less than 20 nm and not more than 35 nm at the position of the record layer 11 (i.e., the same depth as the depth of the groove track 2). By this, it is constructed such that, even if the phase changing pit is formed by the light beam B in the record layer 11 within the unreadable area UA, the content of the phase changing pit cannot be detected by the interference between the phase changing pit and the phase pit PI' formed on the upper portion of the phase changing pit.

In the unreadable area UA, the address information is recorded by the pre-pit 4. Thus, at the time of recording the record information, the record position on the DVD-RW 1 can be grasped by the information recording apparatus before the light beam B for recording reaches the record/reproduction area DA in accompaniment with the rotation of the DVD-RW 1.

The above described phase pits PI and PI' may be collectively called as "emboss pre-pits" as the occasion demands.

Next, the record format of the DVD-RW 1 after the lead in area LI and the record/reproduction area DA are formed on the DVD-RW 1 is explained with reference to FIG. 6.

As shown in FIG. 5, after the initialization, in the lead in area LI, there are an initial zone IZ where all zero data ("00h") are recorded, a reference code zone RZ where the reference code including the start information or the like is recorded, a first buffer zone B1 where all zero data are recorded, the above mentioned reproduction-dedicated area RA and the unreadable area UA, and a second buffer zone B2 where all zero data are recorded, in this order from the inner circumference side of the DVD-RW 1.

Among those, the pre-pit 4 is formed in all the lead in area LI except the reproduction-dedicated area RA. The address information indicated by the pre-pit 4 is set to increment sequentially (i.e., increase in digital) from the inner circumference side in the initial zone IZ, the reference code zone RZ and the first buffer zone B1 from the inner circumference side as shown in the left portion of FIG. 5. On the other hand, the address information indicated by the pre-pit 4 is set to decrement (i.e., decrease in digital), as sequentially reverse-calculated from the most inner circumference portion of the record/reproduction area DA (i.e., the most outer circumference portion of the second buffer zone B2) in the unreadable area UA and the second buffer zone B2. Therefore, the address information is discontinuous between the most inner circumference portion and the most outer circumference portion of the reproduction-dedicated area RA.

On the other hand, a so-called sector number of the record information, which corresponds to the address information, is recorded by the phase pit PI in advance at the shipment in the reproduction-dedicated area RA, as shown in the right portion of FIG. 5. The sector number is recorded in the lead in area except the reproduction-dedicated area RA and the unreadable area UA, such that the sector number is continuous including the sector number recorded in the reproduction-dedicated area RA after the initialization. At this time, in the unreadable area UA, the sector number changes continuously between the most inner circumference portion and the most outer circumference portion of the unreadable area UA.

Next, the reason why the depth of the phase pit PI in the reproduction-dedicated area RA is set to be not less than 60 nm and not more than 90 nm (preferably not less than 70 nm and not more than 80 nm) which is deeper than the groove track 2 is explained with reference to FIG. 6.

FIG. 6 shows a graph indicating the relationship between (i) the output level of the detection signal detected from the reproduction-dedicated area RA (i.e., the detection signal corresponding to the sector number etc., recorded by the phase pit PI) and the output level of the tracking error signal for the tracking servo control by means of the push-pull method and (ii) the depth of the phase pit PI. FIG. 6 shows the result of the experiment in such a case that the wavelength of the light beam B is not less than 630 nm and not more than 680 nm.

As described above, in order to detect the sector information etc., recorded in advance in the reproduction-dedicated area RA while performing the tracking servo control accurately in the reproduction-dedicated area RA, it is necessary that both of the above mentioned detection signal and the tracking error signal are detected at the appropriate output levels. As shown in FIG. 6, if the depth of the phase pit PI is not less than 60 nm and not more than 90 nm (as in a range B in FIG. 6), both of those signals can be detected at the tolerable output levels. In addition, it is possible to detect both of those signals at the most appropriate levels if the depth of the phase pit PI is not less than 70 nm and not more than 80 nm (as in a range A in FIG. 6).

Therefore, the phase pit PI in the present embodiment is constructed such that the depth of the phase pit PI is not less than 60 nm and not more than 90 nm (preferably not less than 70 nm and not more than 80 nm).

As described above, according to the DVD-RW 1 of the embodiment, since the phase pit PI formed in the reproduction-dedicated area RA has the depth of not less than 60 nm and not more than 90 nm, it is possible to obtain the detection signal and the tracking error signal at the enough output levels by the light beam B having the wavelength range of not less than 630 nm and not more than 680 nm.

Further, it is possible to obtain the detection signal and the tracking error signal at the higher output level, if the depth of the phase pit PI formed in the reproduction-dedicated area RA is not less than 70 nm and not more than 80 nm.

It is also possible to prevent the operation of obtaining the tracking error signal and the detection signal from the reproduction-dedicated area RA from being disturbed by the pre-pit 4 since the pre-pit 4 is formed within at least the record/reproduction area DA except the reproduction-dedicated area RA.

Further, it is possible to surely avoid the illegal copy and the illegal reproduction with respect to the DVD-RW 1 by the existence of the unreadable area UA and the reproduction-dedicated area RA since the unreadable area UA is formed between the reproduction-dedicated area RA and the record/reproduction area DA.

Furthermore, since the pre-pit 4 is formed within the unreadable area UA and since the address information indicated by the pre-pit 4 within the unreadable area UA is set as reverse-calculated from the address information corresponding to the most inner circumference portion of the record/reproduction area DA, it is possible to record the information with respect to the record/reproduction area DA while grasping the record position accurately while it is not influenced by the existence of the reproduction-dedicated area RA.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-39800 filed on Feb. 14, 2000 including the specification, claims, drawings and summary is incorporated herein by reference in its entirety.

What is claimed is:

1. An information record medium, on which information is optically recorded and reproduced while a servo control is performed with respect to the information record medium by a push-pull method, comprising:

a record/reproduction area having a groove track, which is wobbled and continuously formed and on which the information is recorded and reproduced by a phase changing method by use of a light beam having a wavelength of not less than 630 nm (nanometer) and not more than 680 nm; and a reproduction-dedicated area where a plurality of phase pits are wobbled and formed in advance, each having a depth of not less than 60 nm and not more than 90 nm and where only an information reproduction is possible by the light beam, wherein a pre-pit indicating address information, which corresponds to a record position on the information record medium, of the information, is formed within at least the record/reproduction area except the reproduction-dedicated area.

2. An information record medium according to claim 1, wherein the depth of the phase pit is not less than 70 nm and not more than 80 nm.

3. An information record medium according to claim 2, wherein a pre-pit indicating address information, which corresponds to a record position on the information record medium, of the information, is formed within at least the record/reproduction area except the reproduction-dedicated area.

4. An information record medium according to claim 3, further comprising:

an unreadable area, which has a plurality of unreadable phase pits wobbled and formed in advance, wherein it is not possible to record or reproduce the information from the unreadable phase pits by the light beam, and wherein the unreadable area is further formed between the reproduction-dedicated area and the record/reproduction area on the information record medium.

5. An information record medium according to claim 4, wherein a pre-pit is formed within the unreadable area, and wherein the address information indicated by the pre-pit within the unreadable area is determined based on the address information corresponding to a starting address of the record/reproduction area within the information record medium.

6. An information record medium according to claim 2, further comprising:

an unreadable area, which has a plurality of unreadable phase pits wobbled and formed in advance;

wherein it is not possible to record or reproduce the information from the unreadable phase pits by the light beam, and wherein the unreadable area is further formed between the reproduction-dedicated area and the record/reproduction area on the information record medium.

7. An information record medium according to claim 6, wherein a pre-pit is formed within the unreadable area, and wherein the address information indicated by the pre-pit within the unreadable area is determined based on the address information corresponding to a starting address of the record/reproduction area within the information record medium.

8. An information record medium according to claim 1, further comprising:

an unreadable area, which has a plurality of unreadable phase pits wobbled and formed in advance, wherein it is not possible to record or reproduce the information from the unreadable phase pits by the light beam, and wherein the unreadable area is further formed between the reproduction-dedicated area and the record/reproduction area on the information record medium.

9. An information record medium according to claim 8, wherein a pre-pit is formed within the unreadable area, and wherein the address information indicated by the pre-pit within the unreadable area is determined based on the address information corresponding to a starting address of the record/reproduction area within the information record medium.

* * * * *